(12) United States Patent
Periyannan et al.

(10) Patent No.: US 10,869,001 B2
(45) Date of Patent: *Dec. 15, 2020

(54) PROVISION OF VIDEO CONFERENCING SERVICES USING A MICRO POP TO EXTEND MEDIA PROCESSING INTO ENTERPRISE NETWORKS

(71) Applicant: VERIZON PATENT AND LICENSING INC., Basking Ridge, NJ (US)

(72) Inventors: Alagu Periyannan, Palo Alto, CA (US); Emmanuel Weber, San Jose, CA (US); Michael Grupenhoff, Sunnyvale, CA (US); Maulik Shah, San Jose, CA (US); Shacolby Jackson, Menlo Park, CA (US); Swaroop Kulkarni, San Jose, CA (US); Oded Gal, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,840

(22) Filed: Jun. 24, 2019

(65) Prior Publication Data
US 2019/0373215 A1 Dec. 5, 2019

Related U.S. Application Data

(63) Continuation of application No. 14/216,363, filed on Mar. 17, 2014, now Pat. No. 10,334,206.
(Continued)

(51) Int. Cl.
*H04N 7/14* (2006.01)
*H04N 7/15* (2006.01)
*H04L 29/06* (2006.01)

(52) U.S. Cl.
CPC .......... *H04N 7/148* (2013.01); *H04L 63/029* (2013.01); *H04L 65/403* (2013.01);
(Continued)

(58) Field of Classification Search
CPC ......... H04N 5/265; H04N 7/141; H04N 7/152
See application file for complete search history.

(56) References Cited

U.S. PATENT DOCUMENTS 7,849,128 B2 * 12/2010 Yao .................... H04N 21/8126
709/202
7,965,703 B2 6/2011 Rieger
(Continued)

FOREIGN PATENT DOCUMENTS

EP 1372302 A2 12/2003
EP 1830568 A2 9/2007

OTHER PUBLICATIONS

International Search Report & Written Opinion dated Dec. 10, 2014, from the ISA/European Patent Office, for International Patent Application No. PCT/US2014/029962 (filed Mar. 15, 2014), 10 pgs.
(Continued)

*Primary Examiner* — Parth Patel
*Assistant Examiner* — Berhanu D Belete

(57) ABSTRACT

A data stream from an internal endpoint of a video conference participant is received at an enterprise media processing node. The internal endpoint is accessible to the enterprise media processing node behind a firewall on an enterprise network. The received data stream is translated and transcoded into a predefined common communication protocol. A data stream in the common communication protocol is received at an external media processing node using a firewall friendly protocol to traverse the firewall from an external endpoint. The external endpoint communicates with the external media processing node outside the
(Continued)

enterprise network. A composite data stream of the received data streams from endpoints within the enterprise network and outside the enterprise network is selectively generated, and sent to the internal endpoint.

12 Claims, 6 Drawing Sheets

Related U.S. Application Data

(60) Provisional application No. 61/803,299, filed on Mar. 19, 2013, provisional application No. 61/794,753, filed on Mar. 15, 2013.

(52) U.S. Cl.
CPC .......... *H04L 65/605* (2013.01); *H04L 69/08* (2013.01); *H04N 7/152* (2013.01); *H04L 63/0272* (2013.01)

(56) References Cited

U.S. PATENT DOCUMENTS

| | | | |
|---|---|---|---|
| 8,208,000 B1* | 6/2012 | Swanson | H04N 7/152 348/14.08 |
| 8,482,593 B2 | 7/2013 | Periyannan et al. | |
| 8,514,263 B2 | 8/2013 | Periyannan et al. | |
| 8,749,610 B1* | 6/2014 | Gossweiler | H04L 12/1827 348/14.08 |
| 8,875,031 B2 | 10/2014 | Periyannan et al. | |
| 8,885,013 B2 | 11/2014 | Periyannan et al. | |
| 9,035,997 B2 | 5/2015 | Periyannan et al. | |
| 9,041,765 B2 | 5/2015 | Periyannan et al. | |
| 9,124,757 B2 | 9/2015 | Weber | |
| 9,143,729 B2 | 9/2015 | Anand et al. | |
| 9,154,735 B2 | 10/2015 | Periyannan et al. | |
| 9,232,191 B2 | 1/2016 | Periyannan et al. | |
| 9,300,705 B2 | 3/2016 | Periyannan et al. | |
| 10,334,206 B2 | 6/2019 | Periyannan et al. | |
| 2003/0025787 A1 | 2/2003 | Stephens, Jr. | |
| 2003/0071890 A1 | 4/2003 | McClure | |
| 2005/0207433 A1* | 9/2005 | Ni | H04L 12/66 370/401 |
| 2006/0023644 A1 | 2/2006 | Jang et al. | |
| 2007/0242696 A1 | 10/2007 | Signaoff et al. | |
| 2007/0288483 A1 | 12/2007 | Yao et al. | |
| 2008/0158339 A1* | 7/2008 | Civanlar | H04N 7/152 348/14.09 |
| 2009/0295905 A1* | 12/2009 | Civanlar | H04L 47/724 348/14.09 |
| 2010/0066805 A1* | 3/2010 | Tucker | H04N 21/25875 348/14.08 |
| 2010/0066808 A1* | 3/2010 | Tucker | H04N 21/44245 348/14.09 |
| 2010/0083268 A1* | 4/2010 | Morris | G06F 9/526 718/104 |
| 2011/0279634 A1 | 11/2011 | Periyannan et al. | |
| 2011/0279635 A1* | 11/2011 | Periyannan | H04N 7/152 348/14.09 |
| 2012/0082226 A1* | 4/2012 | Weber | H04N 19/166 375/240.12 |
| 2012/0169836 A1* | 7/2012 | Setlur | H04L 12/1827 348/14.11 |
| 2012/0246212 A1* | 9/2012 | Ahmad | H04L 65/80 709/201 |
| 2014/0092203 A1 | 4/2014 | Periyannan et al. | |
| 2014/0139609 A1 | 5/2014 | Lu et al. | |
| 2014/0149562 A1* | 5/2014 | Xiao | H04N 21/44222 709/222 |
| 2014/0267577 A1 | 9/2014 | Weber et al. | |
| 2014/0289303 A1* | 9/2014 | Tarricone | H04L 65/103 709/201 |

OTHER PUBLICATIONS

Non-Final Office Action dated Jun. 29, 2016, for U.S. Appl. No. 14/216,363, filed Mar. 17, 2017, 17 pages.
Amendment filed Sep. 12, 2016, for U.S. Appl. No. 14/216,363, filed Mar. 17, 2014, 15 pages.
Final Office Action dated Dec. 14, 2016, for U.S. Appl. No. 14/216,363, filed Mar. 17, 2014, 22 pages.
Amendment and Response filed Feb. 10, 2017, for U.S. Appl. No. 14/216,363, filed Mar. 17, 2014, 19 pages.
Advisory Action filed Mar. 20, 2017, for U.S. Appl. No. 14/216,363, filed Mar. 17, 2014, 4 pages.
Appeal Brief filed May 5, 2017, for U.S. Appl. No. 14/216,363, filed Mar. 17, 2014, 29 pages.
Appeal Brief filed Jun. 8, 2017, for U.S. Appl. No. 14/216,363, filed Mar. 17, 2014, 8 pages.
Non-Final Office Action dated Jan. 22, 2018, for U.S. Appl. No. 14/216,363, filed Mar. 17, 2014, 19 pages.
Response to Office Action filed Apr. 6, 2018, for US. Appl. No. 14/216,363, filed Mar. 17, 2014, 15 pages.
Final Office Action dated Sep. 10, 2018, for U.S. Appl. No. 14/216,363, filed Mar. 17, 2014, 19 pages.
Response to Final Office Action filed Nov. 9, 2018, for U.S. Appl. No. 14/216,363, filed Mar. 17, 2014, 18 pages.
Advisory Action dated Jan. 7, 2019, for US. Appl. No. 14/216,363, filed Mar. 17, 2014, 3 pages.
Amendment filed Jan. 22, 2019, for U.S. Appl. No. 14/216,363, filed Mar. 17, 2014, 16 pages.
Notice of Allowance dated May 6, 2019, for U.S. Appl. No. 14/216,363, filed Mar. 17, 2014, 10 pages.
Office Action dated Jun. 18, 2019, from the European Patent Office, for European Patent Application No. 14732989.0, 7 pages.

\* cited by examiner

PROVISION OF VIDEO CONFERENCING SERVICES USING A MICRO POP TO EXTEND MEDIA PROCESSING INTO ENTERPRISE NETWORKS

CROSS REFERENCE TO RELATED APPLICATIONS

This application is a Continuation Application of U.S. application Ser. No. 14/216,363, filed on 17 Mar. 2014, which is a non-provisional patent application of and claims priority to U.S. Provisional Application No. 61/794,753, entitled "System and Service for Providing Video Conferencing Using Micropop to Extend Cloud Server into Customer Networks," filed on Mar. 15, 2013 and U.S. Provisional Application No. 61/803,299, entitled "System and Service for Providing Video Conferencing Using Micro Pop to Extend Cloud Server into Customer Networks," filed on Mar. 19, 2013, each of which is incorporated by reference herein.

FIELD OF THE INVENTION

The present invention is directed to extending video conferencing media processing services into enterprise networks.

BACKGROUND

Traditionally, legacy video conference systems, such as video conferencing systems with endpoints using an implementation of the H.323 protocol standards (herein after H.323 endpoints), have been limited to communication with other endpoints within a local area network (LAN) of a corporation. There have been attempts made to enable the H.323 endpoints to seamlessly communicate with endpoints outside the corporate network through firewalls—some of which have been standardized in the form of International Telecommunication Union (ITU) protocol extensions to H.323, namely H.460.17, 18, 19, 23, 24. These standards have not be universally implemented and in many cases not implemented in a compatible manner by all endpoints. Moreover such standards only allow communications through corporate firewalls, but do not allow efficiently mixing some endpoints being inside the firewall and some being outside the firewall and only the minimal amount of traffic traversing the firewall boundary. Other attempts have been advocated by video conferencing equipment vendors which include deploying gateway hardware or software within the demilitarized zone (DMZ) (e.g., behind a firewall) of the corporate network. Such gateways also only allow communications through corporate firewalls, but do not allow efficiently mixing some endpoints being inside the firewall and some being outside the firewall and only the minimal amount of traffic traversing the firewall boundary. However, none of these attempts have been very successful as evidenced by the fact use of such legacy systems to make outside calls or join outside meetings on external bridges are still cumbersome or take up a lot of bandwidth at the corporate network boundary.

The conventional approach for video conference systems has been for a customer to buy the hardware (e.g., servers) and deploy the servers on the customer's internal LAN/wide area network (WAN) to provide video conferencing services for use internally as well as allow external users (e.g., outside their firewall) to connect up and participate in the call using the server installed within the customer's LAN/WAN. Such approaches deplete the customer's bandwidth in attempts to support the conference calls with both internal users and external users to the customer's network because traffic for the conference must be sent from external users to the server inside the network and then the conference data must once again be sent to each of the external user to the call.

Additionally, there are security concerns when there is communication with devices/systems outside of the customer's network. Due to the security concerns, most systems in practice that employ such approaches are only used for internal communication. Furthermore, configuring legacy systems and systems using the conventional approach requires a great deal of administrative work and in house knowledge on the customer side. As such, an improved approach to video conferencing systems is needed.

SUMMARY OF THE INVENTION

Embodiments are described for provision of video conferencing media processing services within enterprise networks. In some embodiments, at least one data stream from at least one internal endpoint of a video conference participant is received at an enterprise media processing node and the at least one internal endpoint is accessible to the enterprise media processing node behind a firewall on an enterprise network, translating and transcoding of the received at least one data stream into a predefined common communication protocol is selectively performed, at least one data stream in the common communication protocol is received at an external media processing node using a firewall friendly protocol to traverse the firewall from at least one external endpoint and the at least one external endpoint communicating with the external media processing node outside the enterprise network, a composite data stream of the received data streams from endpoints within the enterprise network and outside the enterprise network is selectively generated, and the composite data stream is sent to the at least one internal endpoint using a corresponding communication protocol used by the at least one internal endpoint.

DETAILED DESCRIPTION

Figure 1:
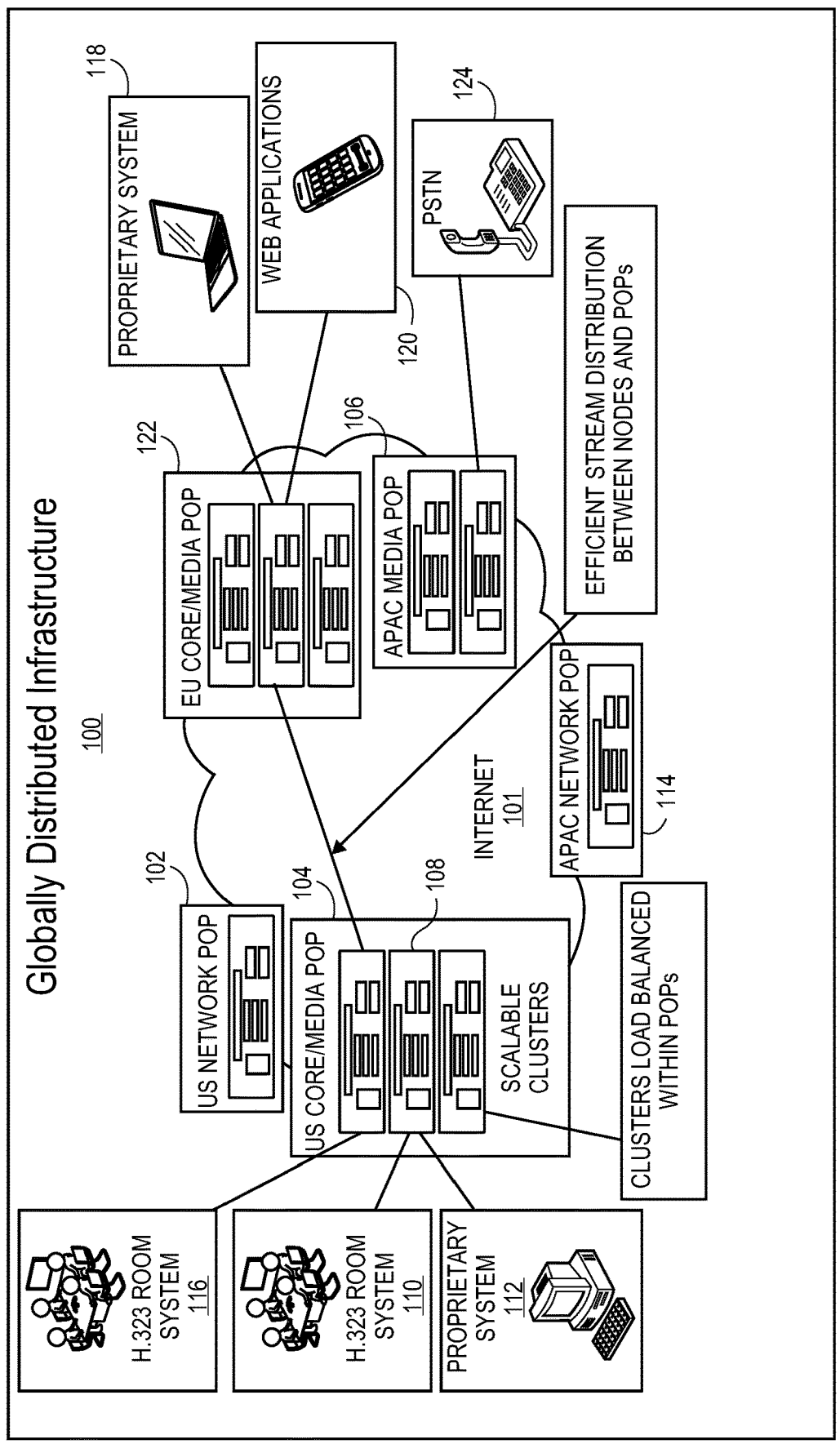
FIG. 1 depicts an exemplary system in accordance with some embodiments of the invention.

Embodiments of apparatuses, computer systems, computer readable mediums, and methods for a video conference system are described. In some embodiments, a piece of hardware and/or software forming a Micro Point of Presence (POP) may be located, accessible, and placed into an enterprise network (e.g., LAN and/or WAN) with authorization, and the Micro POP may provide a set of services offered with the video conference system (e.g., POPs of the globally distributed infrastructure of the video conference system). An enterprise may be an organization, a corporation, a company, a communications service provider, a customer or a user of a communications service provider, a customer or user of the video conference system, a population of a city or country, and/or any other identifiable group of users with access to a network. The Micro POP may communicate with elements/services of the video conference system (e.g., a POP of the globally distributed infrastructure accessible on the Internet and/or other Micro POPs either within the same enterprise network or other enterprise networks) to offer services, thereby allowing for an extension of media processing services that are available with the globally distributed infrastructure of the video conference system into the enterprise network, while abiding by predefined policies for the Micro POP as defined by the enterprise (or administrator for the enterprise).

The Micro POP may be configured by the enterprise (or an administrator for the enterprise) to provide policies for management of the services (e.g., media processing), thereby affording the enterprise greater security and control over the services offered and improved performance for the enterprise. The video conference system may identify requests from endpoints with access to the enterprise network, and the Micro POP may provide media processing services within their network and/or communicate with the video conference system within the cloud to provide services.

The Micro POP may be viewed as tied to a Core Media POP (e.g., a clustered set of servers forming part of the globally distributed infrastructure of the video conference system and viewed as the "mothership" of the video conference system) and/or another Micro POP in a globally distributed infrastructure for the video conferencing system. In some embodiments, an enterprise may have a plurality of Micro POPs within their enterprise networks to service requests and/or a Micro POP may be in communication with another Micro POP on another enterprise network to service requests. The Core Media POP may be one of a plurality of globally distributed clusters of media processing servers that provide media processing services and communicate with other Core Media POPs or Micro POPs in a globally distributed infrastructure to enable the provision of services to endpoints located around the world. This communication between elements of the video conference system (e.g., other POPs) by the Micro POP and shared servicing of requests by the Micro POP and the Core Media POP and/or other Micro POPs may be seamless to the enterprise user. For example, to the enterprise user, the front end and user experience with the video conference system may not change, but the enterprise user may experience improved performance.

Policies can be defined to establish rules for the use of the Micro POP and/or the identifiable group of users that make up the enterprise. For example, a policy can be defined to have requests from all endpoints with access to the enterprise network to be handled by the Micro POP only. Other policies can be defined to allow for requests to be partially handled on the Micro POP and partially handled at a Core Media POP. For example, a video conference can be "chained" to the Micro POP and the cloud media processing server to allow for scaling the video conferencing service without (e.g., adding capacity to globally distributed infrastructure backend) substantially expending processing resources at the backend.

Chaining is the handling of some media processing for endpoints on a multiparty video conference using one or more Micro POPs (e.g., for endpoints internal to an enterprise accessible on an enterprise network) and some media processing (e.g., for endpoints external to the enterprise network) on one or more Core Media POPs, and sending the processed data streams between the Micro POP and Core Media POP to minimize traffic sent over a connection between the Micro POP and Core Media POP. For example, if a Micro POP is servicing a currently speaking user on an endpoint participating in a video conference and a plurality of other endpoints on the video conference, then only the video data stream of that speaking participant (and/or other participants requesting video participation as opposed to audio only participation) serviced by the Micro POP may be sent over to the Core Media POP. Continuing with the example, other participant data streams sent to the Micro POP for the video conference that are mostly silent observers and are not visible (e.g., sending audio only streams and are not speaking) may not be sent to the Core Media POP over the connection, so that bandwidth may be used efficiently. As another example, other participant data streams sent to the Micro POP for the video conference may be sent only as low resolution thumbnail streams since they are currently not speaking and it is adequate to show them in small thumbnail videos to other participants connecting to the Core Media POP. By handling processing at the Micro POP and the Core Media POP, instead of sending all data streams of a video conference between the POPs, data streams can be partially processed into a composites before being sent and/or data streams can be altogether not sent to a Core Media POP or Micro POP, if the data stream is not to be combined with the other streams for the conference. In some embodiments, the participants may choose not to be visible by selecting to send only audio data streams and not video data streams. In other embodiments, the Micro POP may determine that the participant is not speaking and not send the data stream for that participant to the Core Media POP.

In some embodiments, Micro POPs can support recording and storing the conference data inside the enterprise customer's network, so the enterprise has a greater sense of security and control. Whether or not the conference is recorded and stored at the Micro POP and/or Core Media POP can be configured by the customer or enterprise based on their business needs (dictated usually by government regulations, privacy policy, company policy, etc.). If enterprise never wants recordings stored outside their premises, then the enterprise may choose to record and store it at the Micro POP. In some embodiments, this may require provision of storage capacity to the servers running the Micro POP. If they do not want to deal with the hassle of storage and their business allows storage outside their premises, then the recordings can be created in the Core Media POP and stored there. Because the conference may be handled by both Micro POPs and Core Media POPs, the video conference system allows us to support recording and storing at either location.

Traversing firewalls may be easier with the use of Micro POPs because the system uses a firewall-friendly protocol to connect to/from the Micro POP to other POPs (e.g., Core Media POPs). The POPs of the video conference system can connect and communicate using the Micro POP via a protocol that is not firewall-friendly in some embodiments because a connection to the Core Media POP may be deemed trusted.

In some embodiments, for conference participant endpoints internal to the enterprise that do not perform encryption natively (and ordinarily would not be able to join due to policies of the enterprise), the endpoint can still join the conference because the endpoint is connecting to at least one server internal to their network, which may provide greater security for the enterprise's data. The Micro POP can connect to the Core Media POP using an encrypted connection to allow external conference participants to join. This allows the internal endpoints to stay unencrypted inside the enterprise, but ensures the information leaving the enterprise network stays encrypted and hence secure.

The video conference system can deal with failure of the Micro POP. If the Micro POP runs out of processing capacity, for example, the video conference system can burst calls to the backend by proxying the traffic through to the Core Media POP (i.e., handle media processing at the Core Media POP) prior to a failure and/or as a result of a failure.

Because the use of the Micro POP instead of the Core Media POP is transparent (i.e., not apparent to the user viewing the client application), if there is a failure in the Micro POP, the video conference system can use our backend (e.g., a Core Media POP) to host the same call. Media processing may be resource intensive and may require more capacity than is required for simply passing through the traffic to a Core Media POP. When the Micro POP runs out of capacity, the Micro POP may selectively pass through additional media processing requests (e.g., data streams of a video conference) to the Core Media POP rather than deny service to the additional media processing requests. For example, media processing requests that are resource intensive may be passed through or forwarded to the Core Media POP.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011 (issued as U.S. Pat. No. 9,035,997 on May 19, 2015), U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013 (issued as U.S. Pat. No. 9,232,191 on Jan. 5, 2016), U.S. patent application Ser. No. 13/105,704, entitled "Systems and Methods for Security and Privacy Controls for Videoconferencing," filed on May 11, 2011 (issued as U.S. Pat. No. 9,041,765 on May 26, 2015), U.S. patent application Ser. No. 13/105,716, entitled "Systems and Methods for Shared Multimedia Experiences in Virtual Videoconference Rooms," filed on May 11, 2011 (issued as U.S. Pat. No. 8,875,031 on Oct. 28, 2014), U.S. patent application Ser. No. 13/105,719, entitled "Systems and Methods for Novel Interactions with Participants in Videoconference Meetings," filed on May 11, 2011 (issued as U.S. Pat. No. 8,885,013 on Nov. 11, 2014), U.S. patent application Ser. No. 13/105,723, entitled "Systems and Methods for Real-time Virtual-reality Immersive Multimedia Communications," filed on May 11, 2011 (issued as U.S. Pat. No. 9,143,729 on Sep. 22, 2015), and U.S. patent application Ser. No. 13/251,913, entitled "Systems and Methods for Error Resilient Scheme for Low Latency H.264 Video Coding," filed on Oct. 3, 2011 (issued as U.S. Pat. No. 9,124,757 on Sep. 1, 2015), each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services are provided in U.S. patent application Ser. No. 13/105,684, entitled "Systems and Methods for Real-Time Multimedia Communication across multiple standards and proprietary devices" filed on May 11, 2011 (issued as U.S. Pat. No. 9,035,997 on May 19, 2015), and U.S. patent application Ser. No. 14/217,275, entitled "Method and Systems for Interfacing Heterogeneous Endpoints and Web-based Media Sources in a Video Conference," filed Mar. 17, 2014 (issued as U.S. Pat. No. 9,300,705 on Mar. 29, 2016), each incorporated herein by reference in its respective entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;
(2) Scalable mixing and composition of the audio and video streams;
(3) Service delivered across the globe with minimized latency; and
(4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
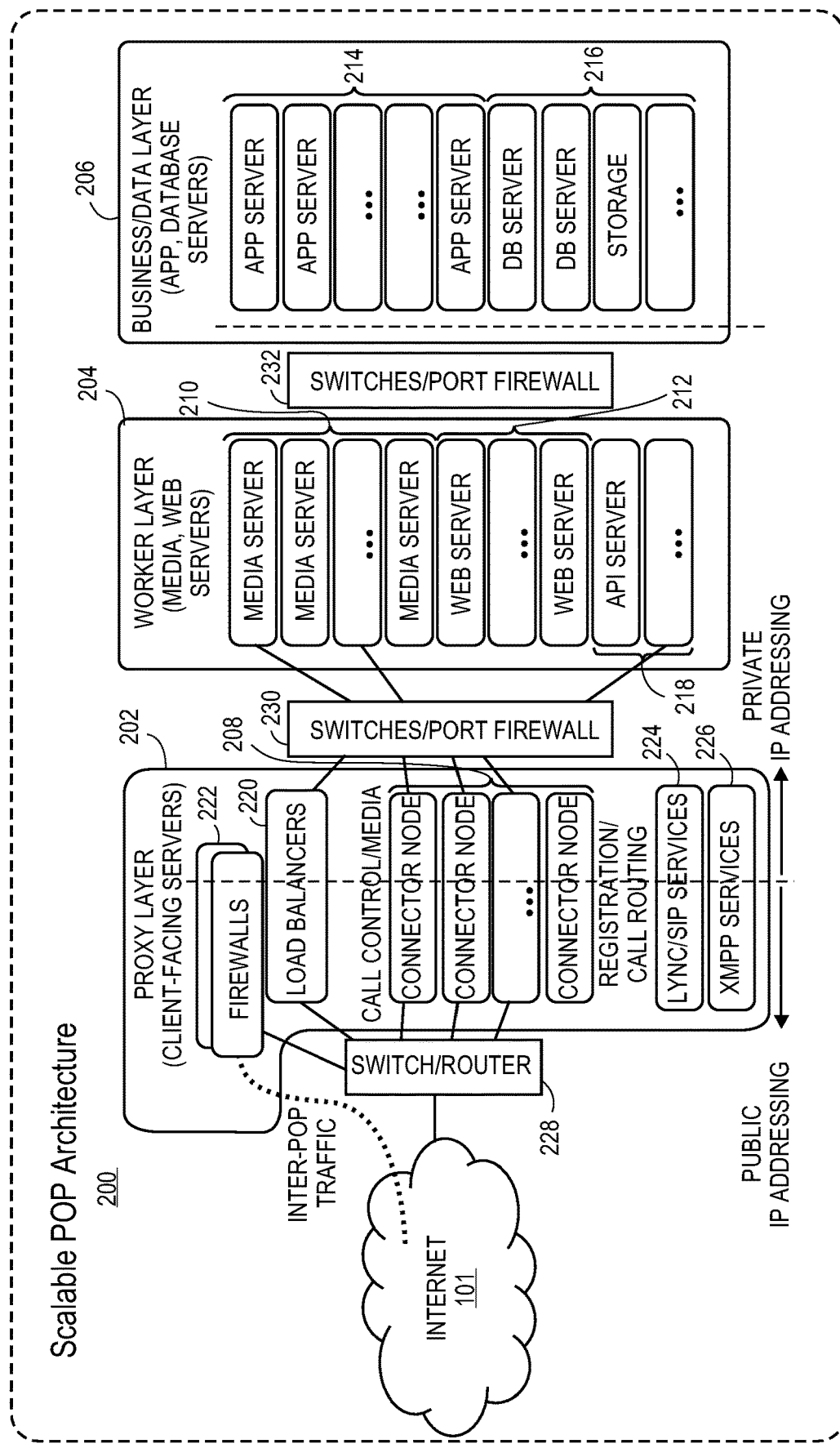
FIG. 2 depicts an exemplary system in accordance with some embodiments of the invention.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, and shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well so that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in several ways. The moderator of the call, in addition to the aforementioned options, has a richer suite of options to pick from through a web interface to manage and control the video conference, which include but are not limited to, (1) Muting subsets of participants during a call.

(2) Sharing content with subsets of participants during the course of a call.

(3) Prescribing a standard layout of the screen of his/her video conference point and a set of displayed callers for other participants to see.

(4) Choosing to display caller-specific metadata on the respective video windows of a subset of the participants, including user-name, site name, and any other metadata.

(5) Easy and seamless way to add or remove participants from the video conference call through a real-time, dynamic web interface.

(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one needs to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Examples of a load balancing that may be practiced in some embodiments are provided in U.S. patent application Ser. No. 14/217,195, entitled "Provision of Video Conferencing with Load Balancing," filed Mar. 17, 2014 (issued as U.S. Pat. No. 9,154,735 on Oct. 6, 2015), and incorporated herein by reference in its entirety. Examples of POP Architectures using reflector MCUs and/or transcoder MCUs that may be practiced in some embodiments are provided in U.S. patent application Ser. No. 14/216,401, entitled "Provision of video conferencing services using reflector multipoint control units (MCU) and transcoder MCU combinations," filed Mar. 17, 2014 (issued as U.S. Pat. No. 9,380,268 on Jun. 28, 2016), and incorporated herein by reference in its entirety.

Figure 3:
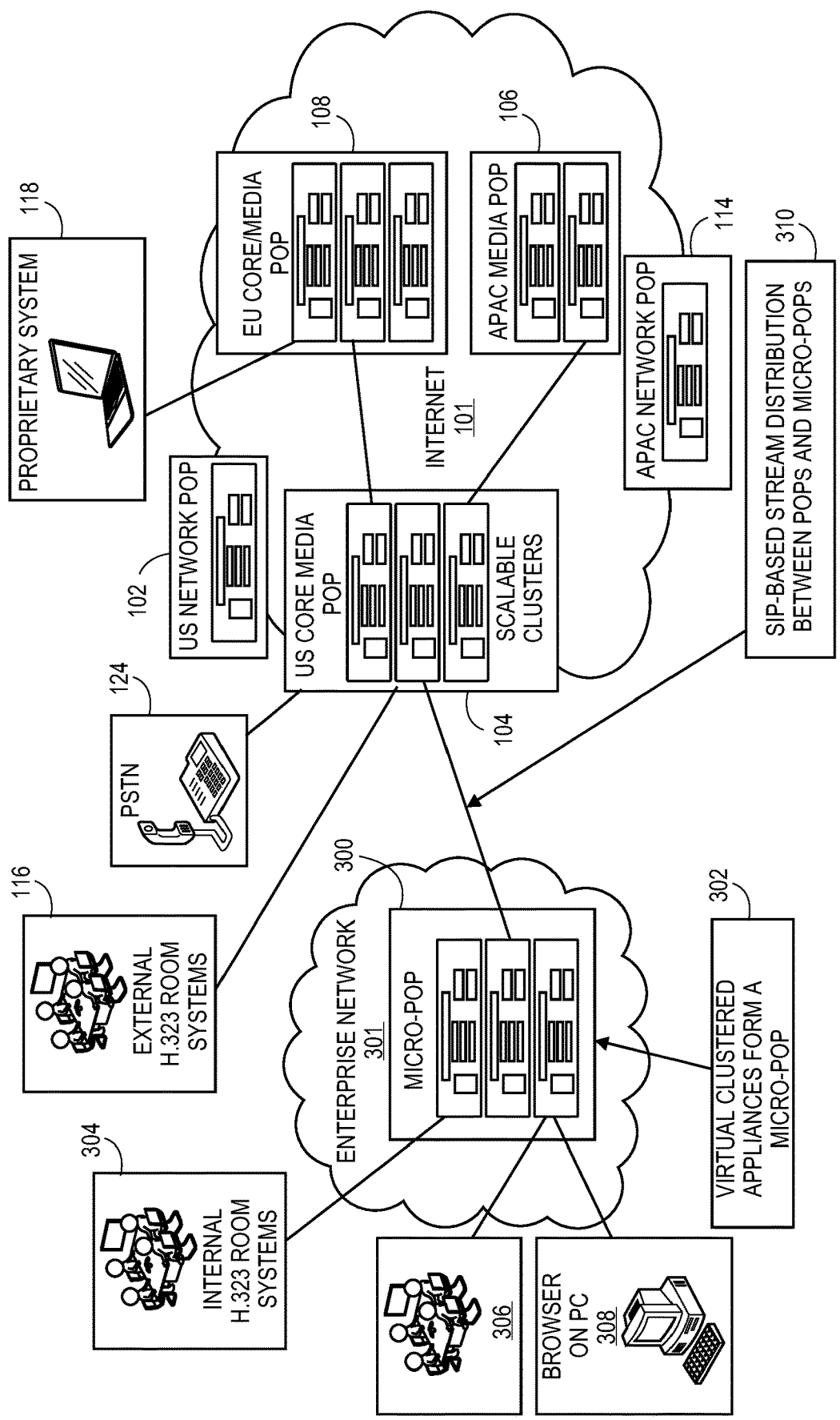
FIG. 3 depicts an exemplary system in accordance with some embodiments of the invention.

FIG. 3 depicts an exemplary system in accordance with some embodiments of the invention. A Micro POP 300 provides a subset and/or all media processing functionality offered by a Core Media POP and/or Network POP for endpoints internal to an organization having access to an enterprise network. The Micro POP 300 may be implemented as a single server and/or one or more clustered appliances (e.g., servers). A cluster consists of a set of one or more loosely connected or tightly connected appliance, servers and/or computers that work closely together such that the servers can be viewed as a single system. Each node (i.e., server) of the cluster may run its own instance of an operating system and provide media processing functionality. The Micro POP 300 may have any number of elements as shown in the Scalable POP Architecture 200 of FIG. 2 to offer services (e.g., connector nodes, media servers, load balancers, etc.). Although FIG. 3 depicts one Micro POP, those with skill in the art will recognize that there can be one or more Micro POPs within an enterprise network.

Internal endpoints (e.g., 304, 306, and 308) may be detected as internal endpoints by virtue of the endpoint having permission to access the enterprise network. Internal endpoints may then be able to access and/or communicate with the Micro POP 300 over an enterprise network 301, such as a LAN and/or WAN protected by a firewall and/or a private bank exchange (PBX) system for the organization. In some embodiments, web servers and/or PBX systems of an organization may be configured to send requests from internal endpoints to the Micro POP 300. In other embodiments, the Core Media POPs (e.g., 104) may redirect requests received from internal endpoints and/or from mobile endpoints when the endpoint gains access to the enterprise networks 301. In some embodiments, the Core Media POP may be able to redirect requests from an internal endpoint as soon as the endpoint is detected as having access to the network. This detection and decision of whether the endpoint is an internal endpoint with access to the network can be done with a variety of methods, including but not limited to, the following: identifying the IP address from which the endpoint connection originates as within an IP address range for the enterprise, header information in a connection request (e.g., an http request), identity token or certificate associated with the endpoint, username or other identity information of the user using the endpoint, network reachability or accessibility test (e.g., using ping or other network requests) between the Micro POP and the internal endpoint, and looking up any security policies associated with the endpoints or user's identity as provided by the enterprise.

The Micro POP may receive audio and/or video data streams from internal endpoints over the enterprise network and may selectively perform media processing functionality for each video conference, such as transcoding, creating the composite of data streams for an endpoint, forwarding data streams to other nodes and/or POPs, and any other aspect of media processing. The amount of processing and/or type of functionality performed by the Micro POP 300 may be selectively adjusted based upon defined policies, including, but not limited to, a policy based upon a defined threshold or condition, a security policy, a performance policy, and/or a policy based on division of processing by elements of the system. For example, a server of a Micro POP may have a capacity to handle fifty video conferences (e.g., if enterprise deploys 5 servers, then enterprise can handle 250 calls) and if the number of conferences is exceeded, then the processing of additional conferences may be pushed to the Core Media POP. Continuing with the example, a policy may be defined for such a capacity threshold.

The Micro POP 300 may perform media processing for videoconference sessions for internal endpoints thereby allaying any security and performance concerns of the organization by keeping the data of organization members from leaving their enterprise network, when the call involves internal endpoints. For example, if the call involves only internal endpoints, then the Micro POP may handle the media processing of the video conference session such that the internal data does not leave the organization. Continuing with the example, the Micro POP may use less bandwidth for the enterprise because traffic for the internal endpoints does not have to go out over the Internet to reach the Core Media POP and come back again to the enterprise as part of the composite data stream.

The Micro POP 300 may send and receive data streams to/from the Core Media POP 104 over a network (e.g., the Internet) to create composite data streams for video conference sessions involving external endpoints. For example, the Micro POP 300 can receive data streams from endpoints external to the enterprise network to form the composite of data streams for a video conferencing session, and the Micro POP 300 can send transcoded data streams received from internal endpoints to the Core Media POP for creation of the composite. Security policies established by the enterprise may establish any further encryption algorithms applied when data is sent to/from the organization. By way of example, data streams may be transcoded at the Micro POP 300 to have a common SIP RTP protocol and the transcoded data streams may be sent/distributed 310 to the Core Media POP 104 for creation of a composite data stream for endpoints. In some embodiments, additional encryption techniques may be applied when data streams leave the enterprise network and are sent to external Core/Media POPs 104.

Figure 4:
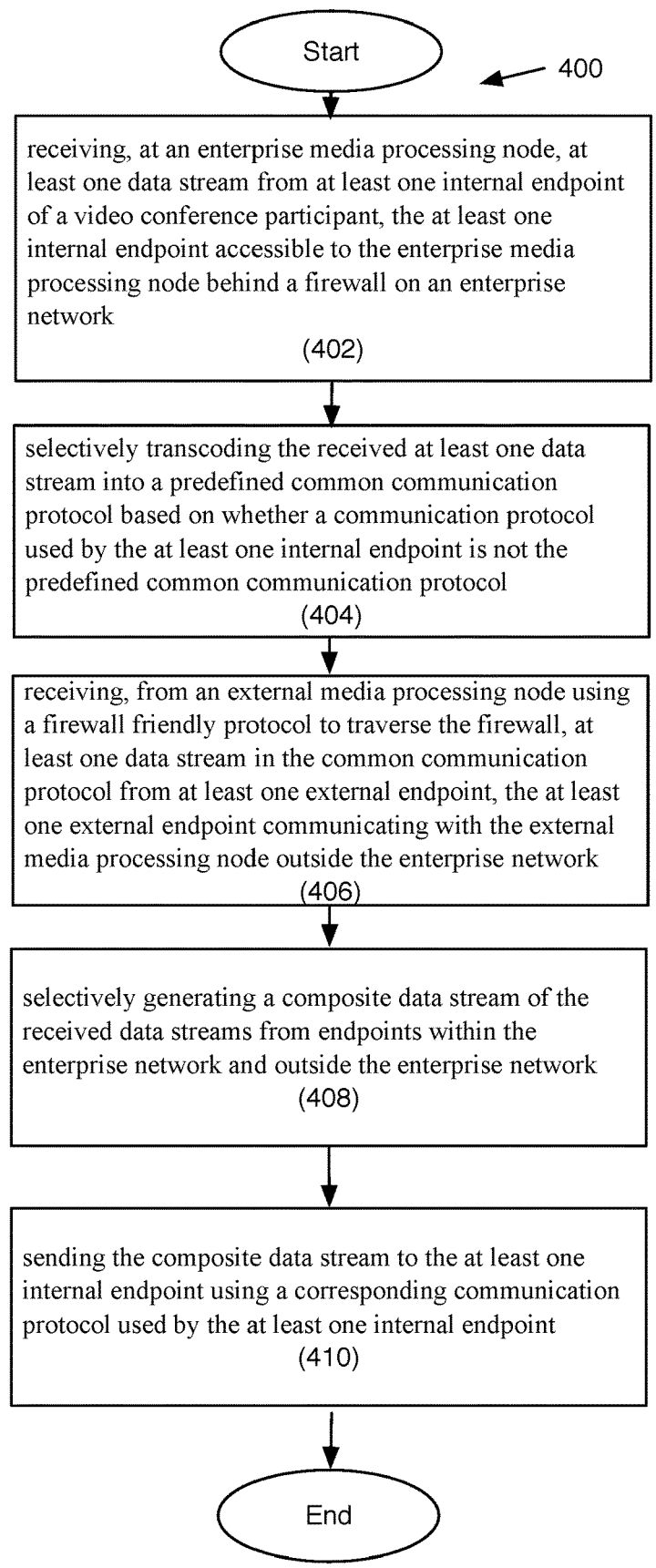
FIG. 4 is a flowchart for an exemplary process in accordance with some embodiments of the invention.

FIG. 4 is a flowchart 400 for an exemplary process in accordance with some embodiments of the invention. At least one data stream from at least one internal endpoint of a video conference participant may be received at an enterprise media processing node (402). The enterprise media processing node of a Micro POP 300 may receive the data stream. The at least one internal endpoint (e.g., 304, 306, or 308) may be accessible to the enterprise media processing node behind a firewall on an enterprise network 301.

The received at least one data stream may be selectively transcoded into a predefined common communication protocol based on predefined conditions and thresholds (404). For example, the received data stream may be translated or transcoded when a condition is met that a communication protocol used by the at least one internal endpoint is not the predefined common communication protocol (e.g., H.264 video over RTP). Alternatively, the received data stream may not be transcoded when the data stream is received from an endpoint using the predefined common communication protocol and simply passed through.

In another example, the data stream may not be transcoded because an enterprise policy with a predefined threshold for processing capacity of the node and/or nodes of the Micro POP 300 has been exceeded. In such a case, the node and/or nodes of the Micro POP 300 may forward the stream to another node either within the Micro POP 300 or at the Core Media POP 104 because a particular predefined capacity has been exceeded. Those with skill in the art will recognize that there are many conditions and/or thresholds that may be used to determine whether media processing functionality occurs at the enterprise processing node of Micro POP 300.

Conditions and thresholds may be set for any portion of the media processing. For example, conditions may be set to partially and/or fully process data streams at either the Micro POP 300 or Core/Media POP 104 to form a composite data stream. Micro POP 300 may create a composite for external endpoints, create a partial composition of received data streams, and/or send data streams without processing to the Core Media POP 104 for composition.

The enterprise media processing node may receive, from an external media processing node (e.g., using a firewall friendly protocol to traverse the firewall) at least one data stream in the common communication protocol from at least one external endpoint (406). The at least one external endpoint may communicate (e.g., send and receive data streams) with the external media processing node (e.g., a node of US Core Media POP 104) outside the enterprise network. The enterprise media processing node of the Micro POP 300 may send a composite of data streams from external endpoints, a single data stream from each external participant endpoint, and/or any combination thereof. The firewall friendly protocol may have one or more of the following attributes: use of a limited number TCP/UDP ports at the internal or external processing node, use of a limited number of IP addresses for the external media processing node, and use of an industry standard communication protocol that can pass through a firewall and/or a border proxy. The firewall may be a standard packet filtering firewall typically used to protect the network, a more sophisticated deep inspection firewall, and/or any other type of firewall. A border proxy terminates all traffic at the firewall and re-originates the traffic so that it can control exactly what is allowed and not allowed in and out of the network with more complex policy rules that are typically not used with a standard packet type filtering firewall.

A composite data stream of the received data streams from endpoints within the enterprise network and outside the enterprise network may be selectively generated for the video conference session at the enterprise media processing node (408). The composite data stream may be generated at the Micro POP 300, the Core Media POP 104, and/or any combination thereof in a communication protocol for a corresponding internal endpoint. In some embodiments, if the communication for an internal endpoint and an external endpoint are the same, then the composite may be created at either the Micro POP 300 or the US Core Media POP 104 to reduce the processing at either the Micro POP 300 or US Core Media POP 104 and forward on to another POP. Policies may also be established by the enterprise when a mobile endpoint leaves an enterprise network either switching processing to a Core Media POP or allowing the endpoint to continue communication with the Micro POP directly. Whether or not an endpoint is serviced by a Micro POP or the Core POP can be decided using various policies, including but not limited to, the following: using the IP address range from which the endpoint connection originates, special header information in the connection request, identity token or certificate associated with the endpoint, username or other identity information of the user using the endpoint, network reachability test (e.g., using ping or other network requests) between the Micro POP and the internal endpoint, security policies associated with the endpoints or user's identity.

The composite data stream may be sent to the at least one internal endpoint using a corresponding communication protocol used by the at least one internal endpoint (410). For example, the composite data stream may be sent to a conference room system endpoint using the H.323 protocol. The Micro POP may handle distribution of composite data streams to internal endpoints and the Core Media POP may distribute composite data streams to the external endpoints.

Figure 5:
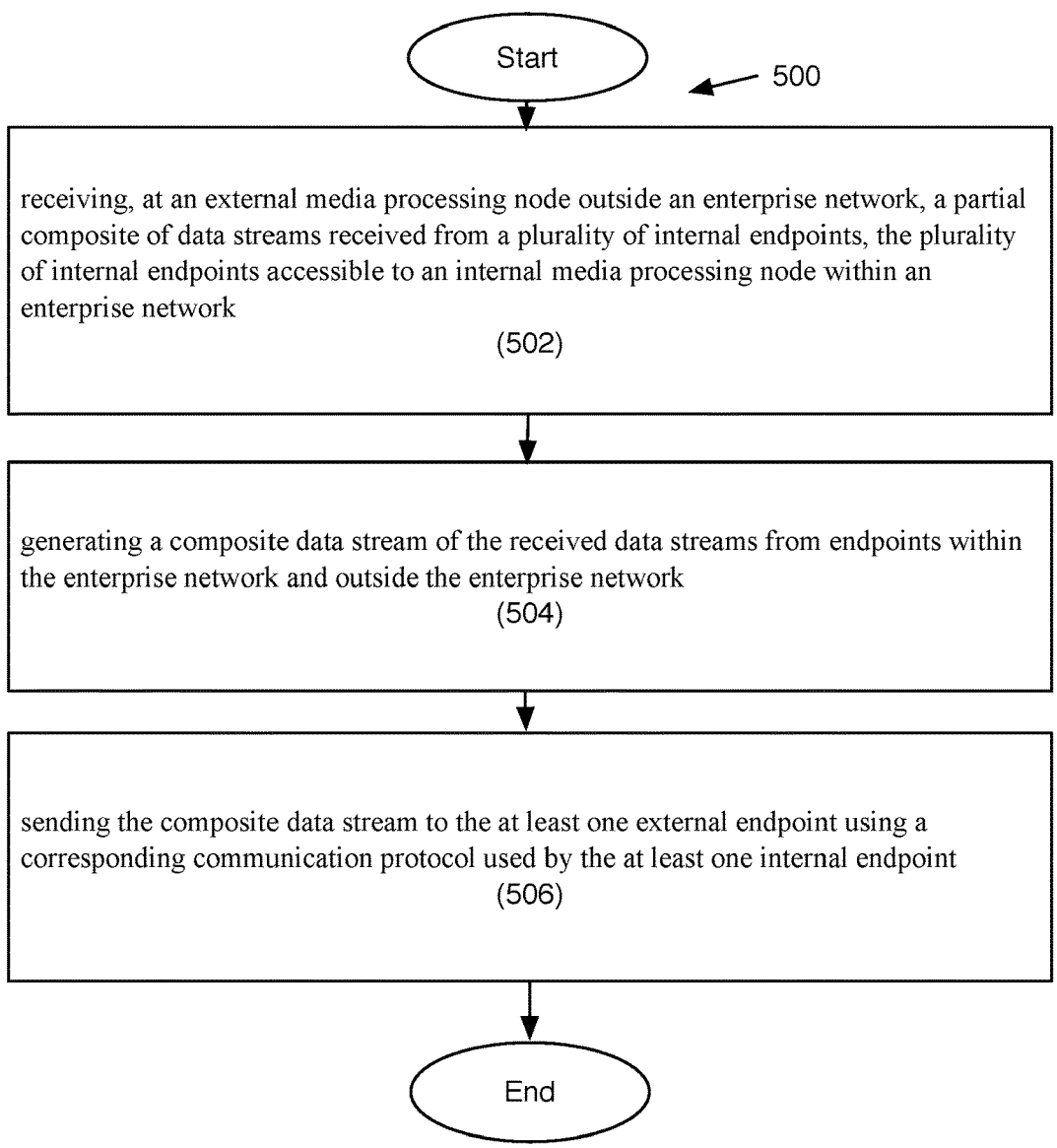
FIG. 5 is a flowchart for an exemplary process in accordance with some embodiments of the invention.

FIG. 5 is a flowchart 500 for an exemplary process in accordance with some embodiments of the invention. One or more data streams received from a plurality of internal endpoints may be received at an external media processing node (502). In some embodiments, a data stream received may be a partial composite of data streams from internal endpoints within an enterprise network. The partial composite may be from a plurality of internal endpoints accessible to an internal media processing node over an enterprise network and the internal media processing node may be in communication with the external media processing node using a firewall friendly protocol.

A composite data stream of the received data streams from internal endpoints within the enterprise network and endpoints outside the enterprise network may be generated (504). The Core Media POP may generate a composite of data streams using the partial composite and received data streams from external endpoints. The composite data stream may be sent to the at least one external endpoint using a corresponding communication protocol used by the at least one internal endpoint (506).

Revenue Sharing

In some embodiments, Micro POPs are deployed on other service provider networks and the service provider can choose to generate additional revenue by revenue sharing, getting a discount on services, and/or through other business models. By way of example, the enterprise (e.g., customer organization or service provider) can open up ports to handle media processing for other users or organizations to generate more revenue or get a discount on their own usage of video conferencing services at Core Media POPs. Similarly, a customer that deploys a Micro POP can offer this in a manner that allows other enterprises or users to access their Micro POP to receive discounts or generate revenue.

Additional Policies

The system and services of the Micro POPs may be placed at various countries and companies that have stricter customer information soil laws and greater privacy laws for compliance. The Micro POP may be designed to integrate with the customer's communication systems/devices, so as to reduce bandwidth usage by the customer, and save on communication network or service provider toll charges. The Micro POP can be configured with policies that ensure the Micro POP hosts all calls for that country and/or company, so that all the processing happens within the boundaries of that country and/or company. This policy may ensure that no information leaves that country or company and becomes discoverable from a privacy point of view.

The Micro POP may be configured to integrate with the customer's communication systems/devices, so as to reduce bandwidth usage on their end, and save on toll charges. If all clients are inside the customer's network then all heavy bandwidth usage stays within the customer's network. If a customer has a phone PBX then phone calls can be directly sent to the Micro POP with extension dialing, so that it does not incur toll charges from the customer's phone carrier for all the calls that happen from inside the customer's PBX system.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 6:
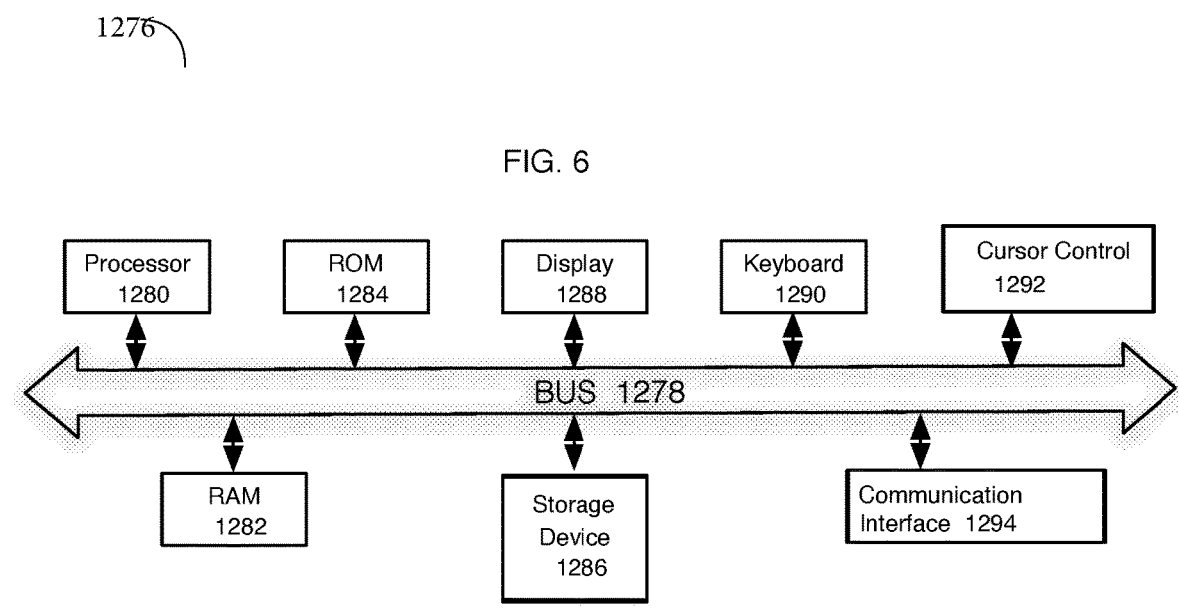
FIG. 6 depicts an exemplary system in accordance with some embodiments of the invention.

Further the procedures described herein may involve the use of various computer systems and computer readable storage media having computer-readable instructions stored thereon. FIG. 6 provides an example of a computer system 1276 that is representative of any of the computer systems or electronic devices discussed herein. Note, not all of the various computer systems may have all of the features of computer system 1276. Computer systems such as computer system 1276 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using a processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention. The computer-readable instructions may be rendered in any computer language including, without limitation, C #, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed:

1. A method comprising:
   receiving, at an enterprise media processing node, at least one data stream from at least one internal endpoint of a video conference system, the at least one internal endpoint accessible to the enterprise media processing node behind a firewall on an enterprise network;
   selectively performing at least one of translating and transcoding the received at least one data stream into a predefined common communication protocol based on whether a communication protocol used by the at least one internal endpoint is not the predefined common communication protocol;
   receiving, at least one data stream in the common communication protocol from at least one external endpoint of the video conference system;
   determining whether a predefined threshold condition for a processing capacity has been met for the enterprise media processing node;
   if the predefined threshold condition has been met, sending the at least one data stream received from the at least one internal endpoint to an external media processing node outside of the enterprise network so as to generate, at the external media processing node, a composite data stream of the data streams received from the at least one internal endpoint and the at least one external endpoint; otherwise, if the predefined threshold condition has not been met, generating, at the enterprise media processing node, the composite data stream of the data streams received from the at least one internal endpoint and the at least one external endpoint; and sending the composite data stream to the at least one internal endpoint using a corresponding communication protocol used by the at least one internal endpoint.

2. The method of claim 1, further comprising:
receiving, from the at least one internal endpoint, a request to join the video conference at at least one of the external media processing node, a web server, a communications service provider server, and a business telephone system; and selectively sending the request to the enterprise media processing node based on whether the at least one internal endpoint has access to the enterprise network.

3. The method of claim 1, wherein sending the at least one data stream received from the at least one internal endpoint to the external media processing node comprises traversing the firewall of the enterprise network.

4. The method of claim 1, wherein the predefined common protocol is a combination of Real-time Transport Protocol and Session Initiation Protocol.

5. A non-transitory computer readable medium storing computer-executable instructions that, when executed by one or more processors, cause the one or more processors to:
receive, at an enterprise media processing node, at least one data stream from at least one internal endpoint of a video conference system, the at least one internal endpoint accessible to the enterprise media processing node behind a firewall on an enterprise network;
selectively perform at least one of translating and transcoding the received at least one data stream into a predefined common communication protocol based on whether a communication protocol used by the at least one internal endpoint is not the predefined common communication protocol;
receive, at least one data stream in the common communication protocol from at least one external endpoint of the video conference system;
determine whether a predefined threshold condition for a processing capacity has been met for the enterprise media processing node;
if the predefined threshold condition has been met, send the at least one data stream received from the at least one internal endpoint to an external media processing node outside of the enterprise network so as to generate, at the external media processing node, a composite data stream of the data streams received from the at least one internal endpoint and the at least one external endpoint;
otherwise, if the predefined threshold condition has not been met, generate, at the enterprise media processing node, the composite data stream of the data streams received from the at least one internal endpoint and the at least one external endpoint; and
send the composite data stream to the at least one internal endpoint using a corresponding communication protocol used by the at least one internal endpoint.

6. The non-transitory computer readable medium of claim 5, wherein the instructions further cause the one or more processors to: receive, from the at least one internal endpoint, a request to join the video conference at at least one of the external media processing node, a web server, a communications service provider server, and a business telephone system; and selectively send the request to the enterprise media processing node based on whether the at least one internal endpoint has access to the enterprise network.

7. The non-transitory computer readable medium of claim 5, wherein sending the at least one data stream received from the at least one internal endpoint to the external media processing node comprises traversing the firewall of the enterprise network.

8. The non-transitory computer readable medium of claim 5, wherein the predefined common protocol is a combination of Real-time Transport Protocol and Session Initiation Protocol.

9. An enterprise media processing node, comprising:
an application interface for receiving video conference requests and creating one or more enterprise policies;
a video compositor and an audio mixer for generating a composite data stream;
a protocol connector for transcoding received data into a predefined common protocol, the protocol connector comprising a video transcoder and an audio transcoder; and
a processor configured to respond to requests for a video conference media processing services in accordance with the one or more enterprise policies by: receiving at least one data stream from at least one internal endpoint of a video conference system, the at least one internal endpoint accessible to the enterprise media processing node behind a firewall on an enterprise network;
selectively performing at least one of translating and transcoding the received at least one data stream into a predefined common communication protocol based on whether a communication protocol used by the at least one internal endpoint is not the predefined common communication protocol;
receiving at least one data stream in the common communication protocol from at least one external endpoint of the video conference system;
determining whether a predefined threshold condition for a processing capacity has been met for the enterprise media processing node;
if the predefined threshold condition has been met, sending the at least one data stream received from the at least one internal endpoint to an external media processing node outside of the enterprise network so as to generate, at the external media processing node, a composite data stream of the data streams received from the at least one internal endpoint and the at least one external endpoint; otherwise,
if the predefined threshold condition has not been met, generating, in accordance with the one or more enterprise policies, the composite data stream of the received data streams received from the at least one internal endpoint and the at least one external endpoint; and
sending the composite data stream to the at least one internal endpoint using a corresponding communication protocol used by the at least one internal endpoint.

10. The enterprise media processing node of claim 9, wherein the processor is further configured to:
receive, from the at least one internal endpoint, a request to join the video conference at at least one of the external media processing node, a web server, a communications service provider server, and a business telephone system;

and selectively send the request to the enterprise media processing node based on whether the at least one internal endpoint has access to the enterprise network.

11. The enterprise media processing node of claim 9, wherein sending the at least one data stream received from the at least one internal endpoint to the external media processing node comprises traversing the firewall of the enterprise network.

12. The enterprise media processing node of claim 9, wherein the predefined common protocol is a combination of Real-time Transport Protocol and Session Initiation Protocol.

* * * * *